Patented Mar. 7, 1939

2,150,131

UNITED STATES PATENT OFFICE 2,150,131

HAY FEVER ANTIGEN

George E. Rockwell, Milford, Ohio, assignor to Eli Lilly and Company, Indianapolis, Ind., a corporation of Indiana No Drawing. Application May 21, 1937, Serial No. 143,937

10 Claims. (Cl. 167—78)

It is the object of my invention to produce an antigen suitable for oral administration to humans and capable of creating a substantial degree of immunity to hay-fever. I employ the term "hay-fever" in this application to include all those allergies which are pollen-induced, irrespective of the season during which they are prevalent.

A more specific object of my invention is to produce an antigen which will contain a large proportion if not all the antigenic ingredients of pollen, which can be kept indefinitely in dry form, and which will be so prepared that it will be substantially free from harmful effects when administered orally to humans.

In carrying out my invention, I may use either of two general processes, each susceptible of considerable variation. In one process, I take the pollen against which it is desired to create an immunity, de-fat and sterilize it by a method which will not work any substantial loss of antigenicity, and then grind it to a fine powder. By the other process, I extract the de-fatted pollen with a suitable extractant, such as a normal saline or buffered solution, filter the extract through a Berkefeld filter, and then evaporate to dryness. In either process, the resultant product contains the actively antigenic ingredients of the pollen, is in dry form, and can be kept for long periods of time without material loss of effectiveness. This product possesses a relatively high unitage of antigenic activity, and it is therefore desirable to mix it with a diluent, such as starch, the mixture being put up in doses of the desired strength, preferably in the form of capsules.

In the preferred process pollen, desirably de-fatted with some fat solvent such as ether or carbon tetrachloride, is first sterilized. The method of sterilization employed is desirably one which does not result in any material loss of antigenicity. I find that several different sterilization methods are suitable if properly controlled, among such methods being treatment of the pollen with a germicide, exposure to X-rays or ultra-violet light, and heating.

The method of sterilization I prefer to employ comprises treatment of the de-fatted pollen with a germicide, desirably sodium ethyl mercuri thiosalicylate. The effectiveness of sterilization is increased if the germicide is dissolved in an organic solvent, such as alcohol, acetone, or a mixture of acetone and alcohol, rather than in water. In the preferred method 0.16 gram of sodium ethyl mercuri thiosalicylate dissolved in 200 to 400 cc. of 70% ethyl alcohol is used for the treatment of each 100 grams of dry pollen. After the solution is added to the solvent, the mixture is stirred thoroughly and allowed to stand, with occasional further stirring, until tests indicate the pollen to be sterile. This result is usually attained within from two to five days.

If the antigen is not to be put up in gelatine capsules another germicide which can be used is formaldehyde. In one suitable method, I first treat the pollen with formaldehyde, desirably 5% formaldehyde, using about 1 cc. of formaldehyde to 1 gram of pollen. To insure that the pollen is thoroughly wetted and subjected to the action of the germicide, I may mix with the indicated quantity of formaldehyde about 4 volumes of normal saline solution or other suitable wetting agent. The pollen, wetting agent, and formaldehyde are thoroughly mixed and permitted to stand for a period of several hours or until cultural controls indicate that sterilization is complete. The formaldehyde is then neutralized by the addition of sufficient, or slightly more than sufficient, ammonium hydroxide to cause the following reaction:

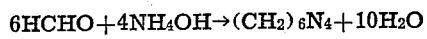

$$6HCHO + 4NH_4OH \rightarrow (CH_2)_6N_4 + 10H_2O$$

Any excess ammonium hydroxide will not be detrimental, as it will be driven off in the drying step which follows. This method of sterilization is not suitable when the product is to be put up in gelatine capsules, as the formaldehyde (or the urotropine formed in its neutralization) has a deleterious effect on the gelatine of the capsules.

In sterilization by the use of X-rays, I have employed a copper target X-ray tube at 35,000 volts and 10 milliamperes current, the pollen being exposed at a point about 5 cm. from the focal spot of the tube. The pollen may be sterilized either in dry form or suspended in normal saline solution, sterilization in the dry form being preferred. Exposures up to 5 hours, more than sufficient to effect complete sterilization, cause no material loss in antigenicity.

In sterilization by the use of ultra-violet light the pollen, desirably suspended in normal saline solution, is exposed to the light from a quartz mercury arc lamp in a layer of 1 mm. to 1 cm. in thickness, the distance from the light source being 20 to 30 cm. and the temperature 20° to 25° C. Under these conditions, sterilization will be effected in a few minutes, but the exposure may be continued up to two hours without resulting in any material decrease in antigenicity of the pollen.

Sterilization by heat is relatively less desirable than other methods, as it tends to cause a loss of antigenicity. I have found, however, that a loss of antigenicity resulting from the application of heat can be descreased by carrying out the sterilization in the presence of a liquid maintained at a pH value near the point of neutrality. If the sterilization is carried out in an open vessel, evaporation of liquid will tend to cause changes in the pH value, and such tendency must be counteracted by frequent adjustments. I therefore prefer, when sterilizing the pollen by heat, to do so in a closed vessel thus preventing any evaporation which would cause or tend to cause changes in the pH value.

As a specific example of sterilization by heat, I may suspend de-fatted air-dried pollen in a neutral liquid such as distilled water or absolute alcohol, in the proportions of 10 cc. of liquid to each gram of pollen. This suspension is placed in a vial which is sealed to prevent escape of any vaporized liquid, and then heated. I prefer to heat the vial in an autoclave at 10 pounds pressure, under which conditions sterilization will ordinarily be effected in about 15 minutes; but if desired the method of fractional sterilization may be practiced.

In all the methods described, sterilization can be effected without causing any material loss of antigenicity in the pollen.

After sterilization the pollen is dried, desirably in a vacuum desiccator. As previously indicated, heat has a tendency to destroy the antigenicity of the pollen; but I find that the alcohol used in the preferred sterilization process has the effect of counteracting this tendency at least in part and that no material loss of antigenicity accompanies drying of an alcohol-treated pollen at 30° to 40° C.

After the sterilized pollen has been dried it is triturated in a ball-mill for about 18 hours to reduce it to a finely comminuted state. The desired quantity of starch is then added and mixed with the pollen, further trituration being employed if necessary. The mixture of finely comminuted pollen and starch is the final product, and is conveniently put up in capsules.

In another method of practicing my invention, de-fatted pollen is extracted with a suitable extractant, such as a normal saline or buffered solution. The most economical proportions are 100 cc. of the extracting fluid to about 10 grams of the pollen. Extraction is conducted for a period of 24 to 48 hours, desirably in a refrigerator, and the resultant extract is filtered through a Berkefeld filter, mixed with starch or other diluent (desirably under vacuum at low temperature), and then ground.

As may be demonstrated by skin tests on individuals of known susceptibility, neither of the processes above described effects any material loss of antigenicity.

The pollen or pollens used will of course depend upon the immunity which is to be created, as the immunity generated is more or less specific. The particular pollen or pollens which cause hay-fever vary widely as between different parts of the country and also as between different seasons of the year. Hay-fevers which occur in the late summer or early fall in the middlewestern and eastern parts of the United States are usually the result of a sensitivity to ragweed pollen. For immunizing against this type of hay-fever, I prefer to employ approximately equal parts of the pollen from giant ragweed and small ragweed. The hay-fevers occurring in late spring or early summer in the territory mentioned above are usually caused by grass pollens; and to produce an antigen generally suitable for immunization against hay-fever occurring at that time of the year, I have found a mixture of equal parts of the pollens from timothy, red top, June grass, orchard grass, and sweet vernal grass to be satisfactory.

While one or the other of the mixed polyvalent antigens just described has been found effective in a large proportion of hay-fever cases, there will of course be individuals susceptible to pollens not included in those mixtures. Antigens produced from one or more pollens other than those mentioned above are therefore within the scope of my invention.

The antigen, comprising the pollen-derived substance preferably diluted as with starch, is administered in graduated doses. The size of the doses will depend to an extent upon the patient, and may therefore be varied within the discretion of the clinician. For immunization against the effects of the spring pollen, I have found it convenient and generally suitable to administer a course of 24 doses increasing from about 500 units for the first dose to about 50,000 units for the tenth dose and continuing at 50,000 units per dose for the remainder of the course. For this purpose a unit is considered as the equivalent in antigenicity of one one-millionth gram of fresh pollen. For immunization against the effects of fall pollens, I prefer a course of about 24 doses increasing from about 500 units for the first dose to 120,000 units for the thirteenth dose, and continuing at 120,000 units for the balance of the course. Doses are conveniently administered at intervals of about twice a week, but this may vary widely at the discretion of the clinician.

The size and potency of the doses in which the pollen is administered is controlled by regulation of the proportions of starch used.

The product produced and administered orally as above described produces substantially the same immunity as is produced by parenterally administered extracts, the digestive tract absorbing the antigenic components of the pollen in unchanged form. In addition to greater ease and convenience of administration my antigen possesses an advantage over parenterally administrable antigens in respect to freedom from dangerous reactions when taken by hypersensitive individuals. Very few reactions have been noted, and none of those which have occurred has been severe.

The term "immunity" is used herein in a broad sense to mean "protection", and does not therefore exclude desensitization.

I claim as my invention:

1. A preparation for immunization against hay-fever, comprising a mixture with starch of de-fatted and dried pollen, finely comminuted, said preparation being capable when administered orally in solid form of being absorbed in the digestive tracts of humans to produce a substantial degree of immunity in a majority of pollen-allergic individuals.

2. A preparation for immunization against hay-fever, comprising a mixture with starch of a dry pollen-derived substance containing the active antigenic ingredients of the pollen, said preparation being capable when administered orally in solid form of being absorbed in the digestive tracts of humans to produce a substantial degree of immunity in a majority of pollen-allergic individuals.

3. A preparation for immunization against hay-fever, comprising a mixture with starch of dried pollen, finely comminuted, said preparation being capable when administered orally in solid form of being absorbed in the digestive tracts of humans to produce a substantial degree of immunity in a majority of pollen-allergic individuals.

4. An antigen for immunization against hay-fever, comprising a dry pollen-derived substance containing the active antigenic ingredients of the pollen, said preparation being capable when administered orally in solid form of being absorbed in the digestive tracts of humans to produce a substantial degree of immunity in a majority of pollen-allergic individuals.

5. An antigen for immunization against hay-fever, comprising dried pollen, finely comminuted, said preparation being capable when administered orally in solid form of being absorbed in the digestive tracts of humans to produce a substantial degree of immunity in a majority of pollen-allergic individuals.

6. A process of producing a dry hay-fever antigen suitable for oral administration, which process comprises sterilizing, comminuting, and drying pollen.

7. A process of producing a dry hay-fever antigen suitable for oral administration, which process consists in subjecting pollen to the action of a solution of a germicide in an organic solvent, comminuting the pollen, and drying it.

8. A process of producing a dry hay-fever antigen suitable for oral administration, which process consists in subjecting pollen to the action of a solution of sodium ethyl mercuri thiosalicylate in alcohol, comminuting the pollen, and drying it.

9. A preparation for immunization against hay-fever, comprising a mixture of starch and the whole water-soluble fraction of pollen, said soluble fraction being in dry form, said preparation being capable when administered orally in solid form of being absorbed in the digestive tracts of humans to produce a substantial degree of immunity in a majority of pollen-allergic individuals.

10. An antigen for immunization against hay-fever, comprising the whole water-soluble fraction of pollen, said soluble fraction being in dry form, said preparation being capable when administered orally in solid form of being absorbed in the digestive tracts of humans to produce a substantial degree of immunity in a majority of pollen-allergic individuals.

GEORGE E. ROCKWELL.